June 21, 1949. C. P. RILEY 2,474,163
GRIPPING MEANS FOR MICROSCOPE MECHANICAL STAGES
Filed Nov. 25, 1946

INVENTOR
CHARLES P. RILEY
BY
ATTORNEY

Patented June 21, 1949

2,474,163

UNITED STATES PATENT OFFICE 2,474,163

GRIPPING MEANS FOR MICROSCOPE MECHANICAL STAGES

Charles P. Riley, Southbridge, Mass., assignor to American Optical Company, Southbridge, Mass., a voluntary association of Massachusetts Application November 25, 1946, Serial No. 712,075

3 Claims. (Cl. 88—40)

This invention relates to microscopes and like instruments and more particularly relates to improvements in mechanical stages for such instruments.

In many types of microscopy, it is common practice to employ transparent slides or haemacytometers for supporting specimens on the microscope stage or platform and in many cases, particularly where high magnifications are being employed, mechanical stages are often employed therewith and provided with means for gripping and shifting the slide relative to the platform and the optical system of the instrument. A known form of such mechanical stages comprises a first excursion or traversing mechanism for moving the slide fore and aft of the platform, a second excursion or traversing mechanism carried thereby for moving the slide laterally, and releasable gripping means for the slide carried by the latter mechanism.

In such mechanical stages, it is desirable that the traversing mechanisms be so constructed and arranged as to move the slide smoothly and easily and without backlash or vibrations particularly during small increments of adjustment of the slide throughout the entire range of adjustment thereof. It is also desirable that the gripping means for the slide work smoothly and easily during the insertion or removal of the slide and without disturbing the adjustment of either traversing mechanism. On the other hand the gripping mechanism should not only be sufficiently strong to retain the slide in place during the excursion of either mechanism but also strong enough to bodily shift the slide when necessary into a gripped position during the insertion thereof. And furthermore the controls for the mechanisms and the gripping means should be conveniently arranged for use by the operator but without interfering with the operation of the other parts of the microscope during the normal use thereof.

It is, accordingly, an object of the invention to provide for use with microscopes or the like a mechanical stage which is of sturdy and economical construction, is provided with traversing mechanisms for smoothly and easily shifting the slide during use of the instrument, and is provided with readily releasable gripping means arranged to be easily and conveniently operated for the insertion or removal of slides or haemacytometers without disturbing the adjustment of either of said traversing mechanisms.

It is an additional object of the invention to provide for such a mechanical stage a construction and arrangement of operating parts and controls therefor which allow the use of a relatively strong spring for closing the slide gripping means and which may be actuated easily and without any tendency to disturb the settings of the traversing mechanisms.

It is a further object of the invention to provide a mechanical stage of the class described having improved means in the form of manual actuating members which are conveniently located and which may be easily operated by one hand of the operator of the instrument for opening and closing the slide gripping means thereof.

These and other objects and advantages of the invention will become apparent from the detailed description which follows when considered in conjunction with the accompanying drawing wherein.

Figure 1:
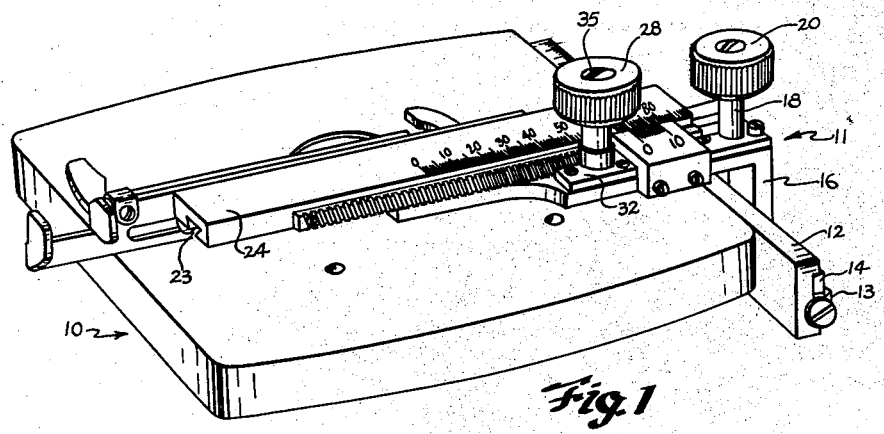
Fig. 1 is a perspective view of a microscope stage and mechanical stage positioned thereon and showing a preferred embodiment of the invention.
Figure 2:
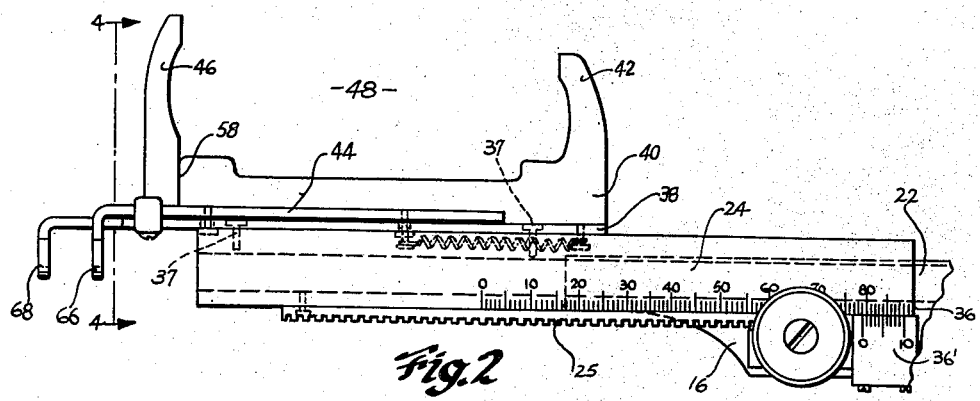
Fig. 2 is a plan view of a portion of the mechanical stage of Fig. 1.

Referring to the drawing in detail and particularly Fig. 1, the numeral 10 indicates generally a microscope stage or platform of conventional construction and provided with a mechanical stage 11 comprising a main supporting member 12 secured by suitable means such as screws or the like (not shown) to a side of said platform. This supporting member is provided with a guide 13 and rack means 14 of known construction extending longitudinally along the outer surface of the supporting member 12 so as to slidably support a second or intermediate supporting member 16 in such manner that actuation of an excursion or traversing mechanism 18 through rotation of a manual control knob 20 will affect fore and aft movement of the intermediate supporting member and the structure carried thereby. Suitable guiding means in the form of an elongated dovetail bar 22 (Fig. 2) is carried by the intermediate member 16 so as to extend transversely of the platform and be slidably engaged by a groove 23 formed in a third supporting member or elongated bar 24.

Figure 3:
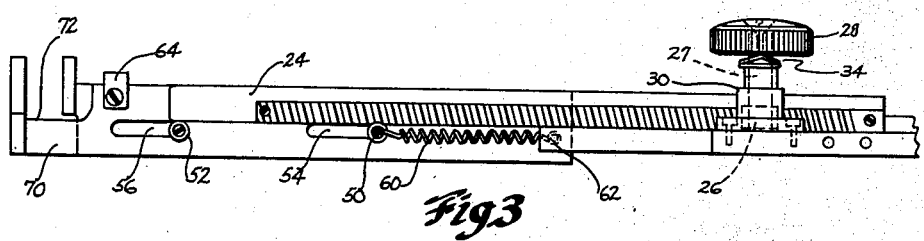
Fig. 3 is a side elevational view of most of the structure of Fig. 2.

The member 24 is provided with rack means 25 on a side thereof for engagement with and actuation by a pinion gear 26 (Fig. 3) secured to a shaft 27 arranged to be actuated by a second control knob 28 so that rotation thereof will affect transverse sliding movement of said elongated bar. The shaft and gear actuated by the knob 28 are partially enclosed in a bearing member 30 and this bearing member is secured by suitable flange means 32 integral therewith to the intermediate supporting member 16. In order that sufficient adjustable resistance to movement of the elongated bar 24 and the structure carried thereby may be provided, friction means in the form of spring washers 34 are positioned on the shaft 27 and clamped between knob 28 and bearing member 30 after the knob 28 has been threaded onto the end of the shaft and properly adjusted, after which a screw 35 is screwed into the end of the shaft and tightened in place for securing knob 28 in its adjusted position. The arrangement of the structure just described is such that the friction in the parts may be adjusted to provide the desired "feel" during the operation thereof and to prevent undesired movement of the bar 24 connected therewith and, on the other hand, the bar and associated structure may be easily actuated by rotation of the knob 28 for affecting a lateral shifting of a microscope slide. Similar friction means (not shown) is employed with the knob 20 for providing any desired amount of resistance for the fore and aft traversing mechanism. A scale 36 and an adjustable vernier 36' may be secured to or carried by the bar 24 and intermediate member 16 respectively and a second scale and vernier provided for the fore and aft traversing mechanism, if desired, for aiding in the systematic exploration of all portions of a conventional slide or the like.

On the opposite side of the elongated bar 24 from the side carrying the rack 25 is fixedly secured by screws or the like as at 37, an elongated plate 38 and an integral portion 40 thereof is arranged to extend at right angles thereto and so as to lie substantially parallel to the upper surface of the platform 10. Carried by the portion 40 is an outwardly extending fixed arm 42 for engagement with an edge portion of a microscope slide or the like. Outwardly of the fixed plate 38 is positioned a movable plate 44 which has integrally secured thereto a movable arm 46 extending outwardly therefrom so as to lie in the same plane as the plane containing the fixed arm 42. As will be apparent from inspection of Fig. 2, the movable arm 46 is of somewhat greater length than the arm 42 so that a three-point support may be provided by these arms when in engagement with a microscope slide positioned therebetween and occupying the space indicated by the numeral 48.

Figure 4:
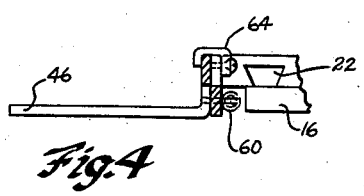
Fig. 4 is a sectional view taken substantially on line 4—4 of Fig. 2 and looking in the direction of the arrows.

Movable plate 44 is secured in place by pins 50 and 52 secured thereto and arranged to extend through slots 54 and 56 respectively in the fixed plate 38. The arm 46 of the movable plate 44 is normally urged toward engagement with an adjacent end 58 of the plate portion 40 by a coiled spring 60 secured at one end to the pin 50 and at its opposite ends to a pin 62 extending from the fixed plate 38. As may be clearly seen in Fig. 3, pins 50 and 52 are provided with washers or the like for guiding the movable plate relative to the fixed plate and for preventing any appreciable separation therebetween. A strap 64 is also secured by screw means to an upper portion of the fixed plate 38, as clearly shown by Figs. 3 and 4, to prevent too much separation between the fixed and movable plates. An integral projection or tab 66 is formed at one end of the movable plate 44 and bent so as to extend toward the operator and lie substantially in alignment with the coiled spring 60. A somewhat similar integral projection or tab 68 is formed on an extension 70 of the lower portion of the fixed plate 38 and is located outwardly of the movable tab 66. A recess 72 in the fixed member 38 provides clearance for the movable tab as it is actuated by the user or operator of the instrument during the insertion or removal of slides from the gripping means of the mechanical stage.

After the tension or friction for the traversing mechanisms has been properly adjusted, the gripping means of the mechanical stage may be easily operated by the user of the instrument by merely a "pinching action" of the opposed tabs or projections 66 and 68 on the movable and stationary plates to thereby open the arms or jaws of the gripping means for the insertion or removal of a slide. Obviously, this "pinching action" can be easily accomplished by the thumb and a finger of one hand only leaving the other hand free to manipulate the slide, and the "pinching action" transmits no appreciable stress to the traversing mechanisms. Accordingly, even though only a slight frictional resistance may be desired in the traversing mechanisms, there will be no tendency for either associated pinion to rotate and thereby disturb the adjustment of either traversing mechanism. Whether a strong or light spring 60 is employed for urging the movable arm 46 toward its gripping position will not affect the traversing mechanisms in any way and thus will function as intended whether the mechanisms be adjusted for a little or much friction.

While the invention has been described primarily in connection with microscope slides and the like, it will be apparent that other objects of equivalent size, such as samples of opaque material, could as readily be gripped by the gripping arms and moved in like manner by the traversing mechanisms of the mechanical stage of the invention.

Having described my invention, I claim:

1. A mechanical stage for use with a microscope or the like comprising a supporting member adapted to be secured to the stage or platform of the microscope, an intermediate supporting member slidably carried thereby and adapted to extend across at least a part of the upper surface of said platform in proximity thereto, a third supporting member carried by said intermediate member and having slidable engagement therewith, a pair of readily operable traversing mechanisms, one of said mechanisms being operatively connected to said first and intermediate members so as to cause movement of said intermediate member and third member in a first direction parallel to said supporting surface during manual operation thereof, the other of said mechanisms being operatively connected to said intermediate and third members so as to cause movement of said third member parallel to said upper surface and in a direction angularly disposed relative to said first direction during manual operation thereof, gripping means carried by said third member and comprising a fixed gripping arm and a movable gripping arm, said movable gripping arm being slidable relative to said third member and said fixed arm, spring means connected to a part fixed relative to said third member and connected to said movable arm and normally urging the movable arm toward said fixed arm, and a pair of spaced tabs connected to said arms respectively and projecting laterally therefrom in adjacent spaced relation to each other so as to provide opposed finger engaging surfaces lying in planes generally perpendicular to the direction of sliding movement of said movable arm, so that an opening of said gripping arms for the insertion or removal of a microscope slide or the like will be effected when said finger engaging surfaces are gripped by the operator and one of said tabs is pressed toward the other.

2. A mechanical stage for use with a microscope or the like comprising a supporting member adapted to be secured to the stage or platform of the microscope, an intermediate supporting member slidably carried thereby and adapted to extend across at least a part of the upper surface of said platform in proximity thereto, a third supporting member carried by said intermediate member and having slidable engagement therewith, a pair of readily operable traversing mechanisms, one of said mechanisms being operatively connected to said first and intermediate members so as to cause movement of said intermediate member and third member in a first direction parallel to said supporting surface during manual operation thereof, the other of said mechanisms being operatively connected to said intermediate and third members so as to cause movement of said third member parallel to said upper surface and in a direction angularly disposed relative to said first direction during manual operation thereof, a fixed plate and a movable plate carried by said third member, opposed gripping arms secured to said plates respectively, guide means interconnecting said fixed and movable plates for allowing limited sliding movement of said movable plate and movable arm relative to said fixed plate and arm carried thereby, spring means connected to a part fixed relative to said fixed plate and connected to said movable plate and normally urging said movable arm toward said fixed arm, a pair of spaced finger engaging projections fixedly carried by said plates respectively, said projections extending laterally from said plates so as to be adjacent and normally spaced in a direction parallel to the direction of sliding movement of said movable plate, so that a separation of said arms may be effected in opposition to the pressure of said spring means when one of said projections is pressed toward the other.

3. In a mechanical stage for use with a microscope or the like and comprising a first supporting member adapted to extend at least partially across the upper surface of the stage or platform of a microscope when positioned for operation in proximity thereto, a movable supporting member carried by said first member and having rectilinear sliding engagement therewith, a rack carried by one of said members and a manually operable pinion supported by the other of said members for effecting relative sliding movement therebetween, the combination of a first plate and gripping arm carried by said movable member, a second plate, guide means connecting said second plate to said first plate for rectilinear sliding movement relative thereto and in a direction parallel to said first sliding movement, a second gripping arm carried by said second plate, spring means connected to said second plate and to a part fixed relative to said first plate and normally urging said second arm toward the arm on said first plate, an element extending outwardly from an end of said first plate and in a direction generally parallel to the direction of said rectilinear sliding engagement, said element having a laterally disposed tab at its outer end, and a laterally disposed tab upon said second plate arranged in normally spaced adjacent relation to said first tab, said tabs being aligned in a direction paralleling the direction of sliding movement of said second plate, whereby one of said tabs may be readily pressed toward the other of said tabs by the fingers of one hand of an operator for effecting a separation of said gripping arms when a microscope slide or the like is being inserted or removed from a position therebetween.

CHARLES P. RILEY.

REFERENCES CITED

The following references are of record in the file of this patent:

UNITED STATES PATENTS

| Number | Name | Date |
| --- | --- | --- |
| 195,186 | Tyner | Sept. 11, 1877 |
| 588,689 | Bausch | Aug. 24, 1897 |
| 703,047 | Dieckmann | June 24, 1902 |
| 977,842 | Sauveur | Dec. 6, 1910 |
| 1,987,734 | De Fonbrune | Jan. 15, 1935 |
| 2,148,908 | Lory | Feb. 28, 1939 |
| 2,279,412 | Posada | Apr. 14, 1942 |
| 2,319,377 | Wallace et al. | May 18, 1943 |